Sept. 13, 1932.  E. SCHNEIDER  1,877,739
ELECTRICAL TESTING INSTRUMENT
Filed June 3, 1925
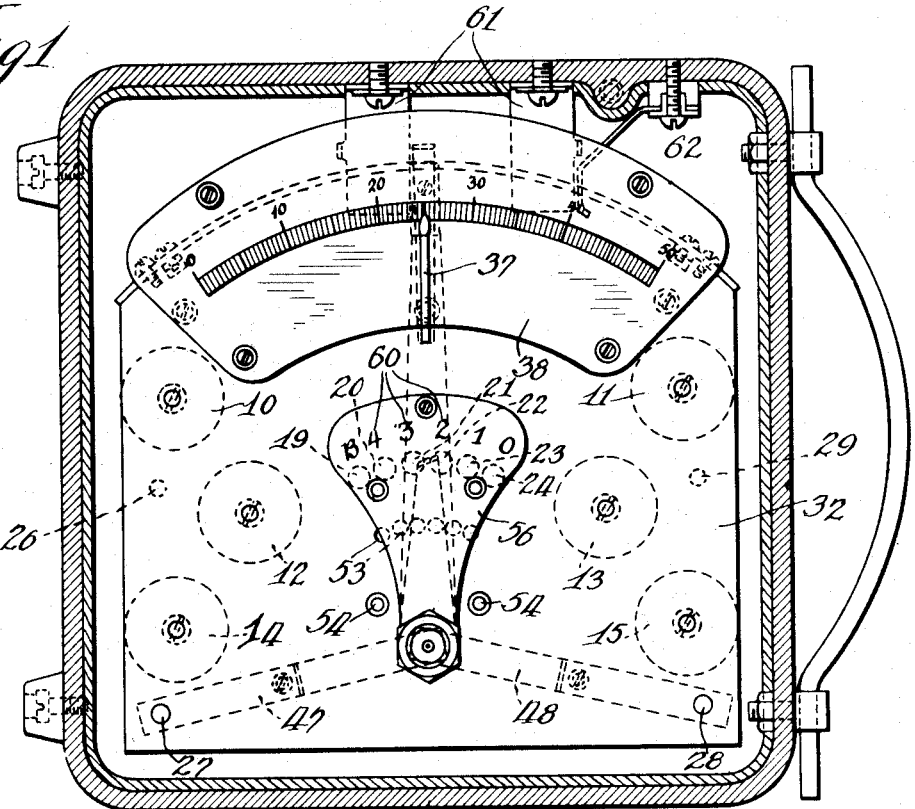
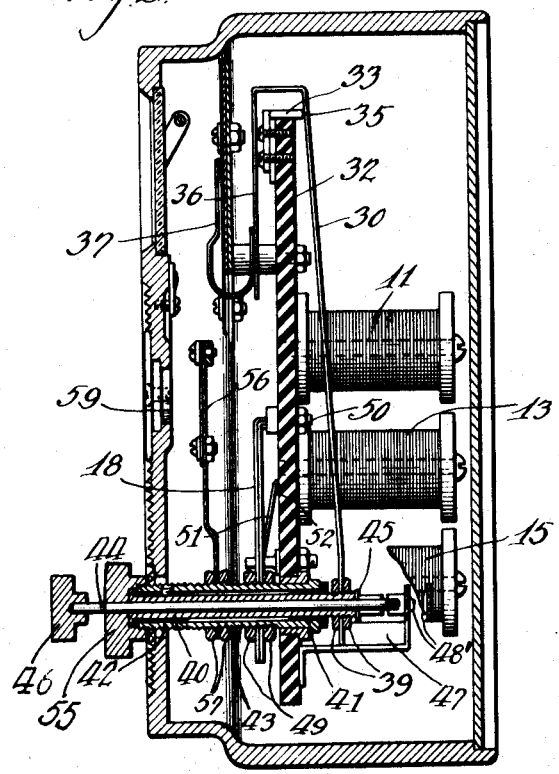
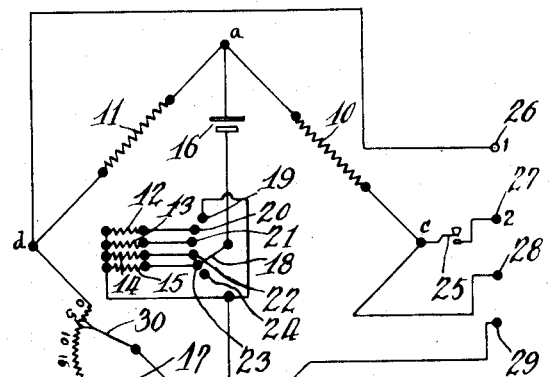
Inventor:
Elmer Schneider
By Nissen & Crane
Attys.

Patented Sept. 13, 1932

1,877,739

UNITED STATES PATENT OFFICE

ELMER SCHNEIDER, OF CHICAGO, ILLINOIS, ASSIGNOR TO REPUBLIC FLOW METERS CO., OF CHICAGO, ILLINOIS, A CORPORATION OF ILLINOIS

ELECTRICAL TESTING INSTRUMENT

Application filed June 3, 1925. Serial No. 34,508.

This invention relates to a test set or instrument intended especially for use in connection with pyrometer installations, but applicable, of course, to other uses.

The invention has for its object the provision of a single instrument which may be used for comparing the readings of voltmeters, and also for measuring resistances. Another object is to provide an instrument of the class named which shall be of improved construction and operation.

The invention is exemplified in the combination and arrangement of parts shown in the accompanying drawing and described in the following specification, and it is more particularly pointed out in the appended claims.

In the drawing,—

Fig. 1 is a front elevation with the case in section, showing one embodiment of the present invention.

Fig. 2 is a central, vertical section of the instrument shown in Fig. 1.

Fig. 3 is a wiring diagram showing the electrical connections of the instrument.

Pyrometers for measuring the temperatures of various apparatus commonly include a thermo-couple, a milli-voltmeter and leads connecting the thermo-couple and voltmeter. It is desirable to check the voltmeter at intervals against a standard instrument so that the voltmeter may be kept in proper adjustment. In making these comparisons it is necessary to note the resistance of the leads from the thermo-couple to the voltmeter in order that proper allowance may be made for the drop in potential over the leads. The present invention combines an instrument which may be used to provide different potentials for the comparison of the voltmeter with a standard; and also a Wheatstone bridge for measuring the resistance of the leads. As shown diagrammatically in Fig. 3, the instrument includes a series of resistance coils numbered 10, 11, 12, 13, 14 and 15, respectively. The coils 10 and 11 are used as balanced coils in the Wheatstone bridge, while the coils 12, 13, 14 and 15 are used in series with the battery 16 to give different potentials for testing the milli-voltmeter. A variable rheostat 17 serves the double purpose of a variable resistance for comparison with the resistances to be measured and means for providing different potentials for the purpose of checking the voltmeters. A switch 18 is arranged to connect with a series of contacts 19, 20, 21, 22, 23 and 24. A push button or opening and closing switch 25 is provided for making and breaking the circuit of the milli-voltmeter when used in connection with the Wheatstone bridge. Binding posts 26, 27, 28 and 29 are provided for connecting the instruments and resistances subjected to tests.

To measure the resistance of a particular lead, the lead is connected between the terminals 28 and 29, and the milli-voltmeter is connected between the terminals 26 and 27. In this case the voltmeter is used as a galvanometer for determining when the Wheatstone bridge is in balance. The switch 18 is set on the terminal 19 so that the battery will be connected to the point indicated by the letter $k$ in the diagram, the other terminal of the battery being connected to the point $a$. The galvanometer will be connected to the points $c$ and $d$, respectively, through the make-and-break switch 25. For most purposes the coils 10 and 11 may have a resistance of fifty ohms each, and the rheostat 17 may have a total resistance of fifty ohms. This will permit the measurement of an unknown resistance from zero to fifty ohms. With the parts connected as described, the contact 30 is shifted along the rheostat 17 until there will be no deflection when the key 25 is closed. The portion of the resistance 17 then in the circuit will be equal to the resistance being measured.

When it is desired to test the voltmeter it will be connected to the terminals 26 and 29. The contact 18 will then be set on one of the contact points 20, 21, 22 or 23, so as to bring the corresponding resistance coils 12, 13, 14 or 15 into series with the cell 16. In practice it has been found convenient to provide the coils 12, 13, 14 and 15 with resistance of 5500 ohms, 2725 ohms, 1800 ohms and 1335 ohms, respectively. With a single dry cell, this will give a voltage drop over the rheostat 17 of a convenient value for checking the milli-voltmeters used in connection with pyrometers. It will be seen that the connection described will place the rheostat 17 and the resistance coil 11 in series with the battery and one of the coils 12, 13, 14 or 15. The voltmeters will be connected at opposite sides of the rheostat 17 so that it will measure the drop in potential over the portion of the rheostat included in the circuit. The two instruments to be compared are connected in parallel between the terminals 26 and 29, and their readings may thus be compared for various potentials by shifting the connection 30.

The physical embodiment of the device is shown in Figs. 1 and 2, and comprises a case 31 having a plate 32 of insulating material, such as fiber board, mounted in upright position therein. Resistance coils 10, 11, 12, 13, 14 and 15 are supported on the rear face of the plate 32. The rheostat 17 comprises a strip of insulating material 33 secured upon the upper, arcuate face of the plate 32 and having a resistance wire wound thereon. The wire may be bare and coated with shellac, in a manner well known in variable rheostats. The traveler or contact finger 30 is arranged to engage successively the various turns of the wire along the edge 35 of the strip 33, so as to bring varying resistances into the circuit. The finger 30 continues upwardly and is bent forwardly and downwardly to the front of the plate 32, as shown at 36 in Fig. 2. An index or pointer 37 is carried by the portion 36 and extends in front of a dial or graduated plate 38. The graduations on the plate 38 indicate directly the resistance in ohms included in the circuit by contact between the finger 30 and the resistance member 33. The finger 30 is secured by lock nuts 39 to a tubular shaft 40, which is journaled for rotation in insulating bushings 41 and 42. The bushings 41 and 42 are carried in an outer tubular member 43, which in turn is also journaled to rotate in the plate 32. A plunger rod 44 slides longitudinally in the sleeve 40, but is held against relative rotation by a pin 45 disposed in a slot formed in the end of the sleeve 40. The end of the plunger 44 is provided with a knob 46 by which the plunger may be rotated and moved longitudinally. Rotation of the knob 46 varies the position of the contact finger 30, and consequently changes the resistance in the circuit. A spring arm 47 is connected to the plate 32 at one side thereof, and the end of the arm extends inwardly into registration with the rear end of the plunger 44 which is provided with an insulating tip, as shown in Fig. 2 of the drawing. A similar spring arm 48 is secured to the opposite side of the plate 32, and its inner end is positioned in the rear of the end of the spring arm 47. The two spring arms are provided with contact points 48', so that when the plunger 44 is moved inwardly connection is made between the two contact points. These arms constitute the push button or make-and-break switch shown as 25 on the wiring diagram, Fig. 3. It will be noted that the terminals 27 and 28 are connected, respectively, to the ends of the spring arms 47 and 48, which brings these connections at opposite sides of the push button, as shown in the diagram. The other terminals 26 and 29 are mounted on the plate 32 at the positions indicated in Fig. 1 and are connected by suitable leads to the points shown in the wiring diagram.

The movable contact 18 is secured to the sleeve 43 by lock nuts 49. This contact is in the form of a leaf spring, the end of which bears upon the contact points 19 to 24, which are secured to the plate 32 by nuts 50, as shown in Fig. 2. The stop spring 51 is connected with the movable contact 18, and is provided with a rounded contact end 52 which engages depressions 53 in the plate 32 to hold the contact 18 in its various positions of adjustment and to accurately locate the contact in registration with the various plugs 19 to 24, respectively. Stop pins 54 may be provided for limiting the movement of the contact 18. The outer end of the sleeve 43 is provided with a knob 55 by means of which it is rotated to shift the movable contact 18. An indicator plate 56 is secured to the sleeve 43 by lock nuts 57, so that the indicator plate oscillates in unison with the movable contact 18. The front of the case 31 is provided with an opening or peep hole 59 for viewing the indicator plate 56. This plate is provided with characters 60 which appear successively through the peep hole 59 and indicate the position of the movable contact 18. The plug 24 is a dead plug and provides a position for disconnecting the battery to prevent it from becoming exhausted when not in use. The battery may comprise a single dry cell which is supported by clips 61 secured to the top of the case. The inner electrode of the battery will contact with a spring 62 also mounted on the case and insulated therefrom. Proper connections will be made to the clips 61 and the spring 62 for connecting the battery as indicated in the wiring diagram.

I claim:

1. An indicating instrument comprising resistance elements, a rotary sleeve, a contact member connected with said sleeve and movable thereby for changing the resistance of one of said elements, a plunger slidably mounted in said sleeve and constantly connected therewith to rotate said sleeve, and contact means actuated by longitudinal movement of said plunger without moving said contact member.

2. An indicating instrument comprising a pair of independently rotary members for changing connections, a plurality of co-axial rotary finger pieces for moving said members, one of said finger pieces being movable in the direction of the axis thereof without moving either of said rotary members, and a contact member actuated by the axial movement of said finger piece.

3. A testing instrument comprising a case, a panel mounted in said case, a resistance element comprising a coil mounted at the edge of said panel, a dial plate in front of said panel, and a contact member movable along said coil for changing the resistance thereof, said contact member having an indicator connected therewith and curved about the edge of said dial plate to provide a pointer movable along the front face of said dial plate.

4. An indicating instrument comprising a pair of co-axial independently rotatable inner and outer sleeves, a contact arm carried by each of said sleeves, finger-pieces for rotating said sleeves, one of said finger-pieces being movable in the direction of the axis thereof without moving either of said sleeves, and a contact member actuated by the axial movement of said finger-piece.

5. An indicating instrument comprising a pair of co-axial independently rotatable inner and outer sleeves, a contact arm carried by each of said sleeves, a rod slidably but non-rotatably mounted within said inner sleeve and connected to rotate therewith, and a contact member actuated by the axial movement of said rod.

6. An indicating instrument comprising a pair of co-axial independently rotatable inner and outer sleeves, a contact arm carried by each of said sleeves, finger-pieces for rotating said sleeves, one of said finger-pieces being movable in the direction of the axis thereof without moving either of the contact arms, a contact member actuated by the axial movement of said last named finger-piece, a scale connected with said outer sleeve to move therewith, and means for registering with said scale to indicate the connection made by said contact arm to which the scale is operatively connected.

7. An indicating instrument comprising in combination, a casing, a panel within said casing, an elongated variable resistance element on said panel, a rotatably mounted member carrying a contact arm for said variable resistance, an indicating plate, said contact arm being extended over said variable resistance element and carrying a pointer co-operating with said indicating plate, a finger-piece for rotating said member, and a contact member actuated by the axial movement of said finger-piece and operable independently of the rotatable member.

8. An indicating instrument comprising in combination, a casing, a panel within said casing, an elongated variable resistance element on said panel, a rotatable sleeve carrying a contact arm for said variable resistance, an indicating plate, said contact arm being adapted to contact with and slide along said variable resistance, said arm being extended over said variable resistance element and carrying a pointer co-operating with said indicating plate, a plunger slidably and non-rotatably mounted within said sleeve, and a contact member actuated by the axial movement of said plunger and independently of the contact arm.

9. An indicating instrument comprising in combination, a casing, a panel within said casing, an elongated variable resistance element on said panel, additional resistance elements arranged to be selectively inserted in series with said variable resistance, contacts for said additional resistances arranged on said panel, a rotatable outer sleeve carrying a contact arm co-operating with said contacts, an inner sleeve journaled within said outer sleeve carrying a contact arm co-operating with said variable resistance, a plunger slidably and non-rotatably mounted within said inner sleeve, and a contact member actuated by the axial movement of said finger-piece and without effecting the inner or outer sleeves.

10. An indicating instrument comprising a pair of co-axial independently rotatable inner and outer sleeves, a contact arm carried by each of said sleeves, finger-pieces for rotating said sleeves, one of said finger-pieces being movable axially, a contact member actuated by said axial movement of said finger-piece, a scale connected with the outer sleeve adapted to move therewith, a panel in front of said scale, and an opening in said panel through which the markings on the scale in alinement with said opening are visible as a means for indicating the adjustment of said outer sleeve.

11. A device as claimed in claim 10 in which a frictional means is provided for holding the outer sleeve in adjusted position.

12. A resistance unit, having in combination a resistor, means including a shaft rotatable for varying the effective resistance of said resistor, a finger-piece non-rotatable relative to said shaft for rotating said shaft and reciprocable independently thereof and a contact member actuated by the reciprocable movement of said finger-piece.

13. In a test instrument, a rotatable sleeve, an arm carried by said sleeve for operation thereby, a finger-piece carried by said sleeve and reciprocable independently thereof but non-rotatable therewith for rotating said sleeve for adjusting the position of said arm and a switch actuated independently of said arm by the reciprocable movement of said finger-piece.

14. An instrument of the class described, having in combination a pair of inner and outer independently rotatable sleeves, a contact arm carried by each of said sleeves, a finger-piece for rotating said outer sleeve for adjusting the arm carried thereby, a plunger slidably mounted in said inner sleeve and constantly connected therewith to rotate said sleeve to adjust the contact arm carried thereby and a switch actuated by the slidable movement of said plunger independently of the arm carried by said inner sleeve.

In testimony whereof I have signed my name to this specification on this 1st day of June, A. D. 1925.

ELMER SCHNEIDER.